June 14, 1938.   M. E. HANSEN   2,120,406
RUBBER GLOVE AND METHOD OF MAKING THE SAME
Filed Dec. 30, 1933
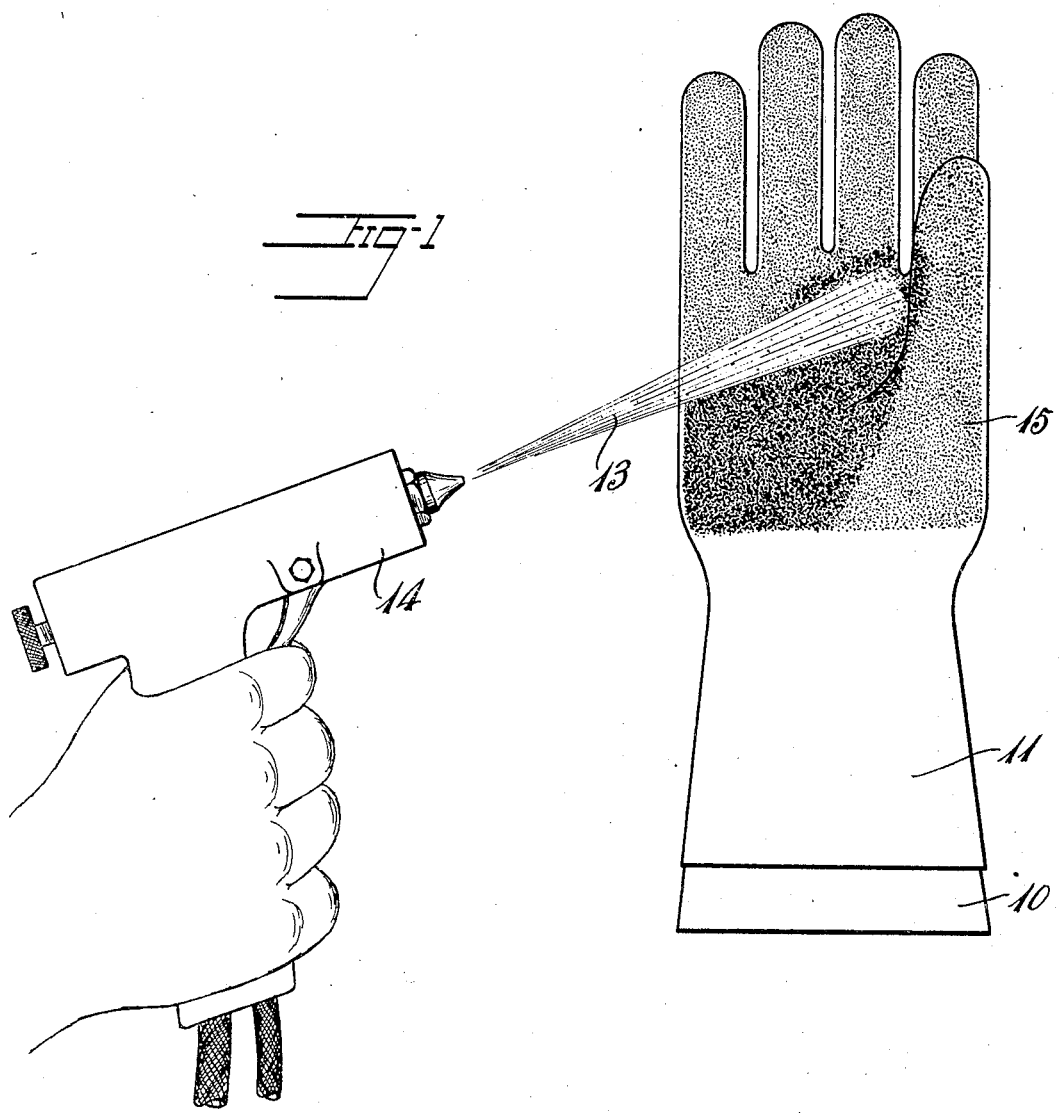
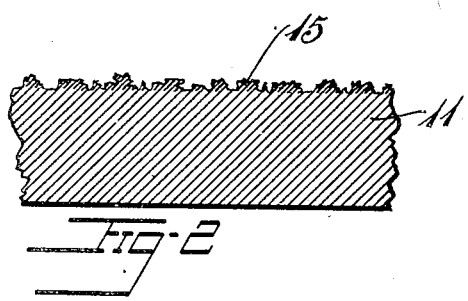

Patented June 14, 1938

2,120,406

UNITED STATES PATENT OFFICE 2,120,406

RUBBER GLOVE AND METHOD OF MAKING THE SAME

Merrill E. Hansen, Akron, Ohio, assignor to American Anode Inc., Akron, Ohio, a corporation of Delaware Application December 30, 1933, Serial No. 704,724

13 Claims. (Cl. 18—58)

This invention relates to rubber gloves and particularly to rubber gloves suitable for wear by a surgeon while performing surgical operations or by others in performing duties which require handling of wet or moist articles which are likely to slip if handled with ordinary rubber gloves, and the chief object of the invention is the economical and efficient manufacture of a rubber glove having a unique non-slip surface, particularly adapted for use as described.

In my invention, I proceed with the manufacture of the body of the glove proper according to any of the well known methods now practiced in the rubber industry in which rubber is deposited upon a glove form from a liquid rubber dispersion such as a rubber cement or an aqueous dispersion of rubber, either a natural or artificial latex. I prefer, however, to employ natural latex because unmasticated rubber derived directly from natural latex possesses certain superior physical properties such as toughness, high tensile strength, and excellent ageing characteristics which are particularly desirable in gloves, and also in order to secure the benefit of processing advantages hereafter to be described. For reasons also hereinafter to be indicated, I prefer to employ a chemical coagulant for the purpose of depositing rubber upon the form, and to employ the coagulant in such a quantity and in such manner as will leave an excess thereof upon the outer surface of the deposited rubber after it is withdrawn from the latex. For example, I may coat an impervious glove form with a thin film or stratum of a water soluble salt of a polyvalent metal, and then immerse the coated form into liquid latex, whereupon a coherent layer of latex rubber will be coagulated upon the form, and polyvalent metal coagulating ions will diffuse throughout the freshly deposited layer of rubber and will be present in appreciable quantities upon the outer surface of the fresh rubber deposit after its withdrawal from the liquid latex. In other cases, I may dip a form into the latex, withdraw the form together with an adhering coating of uncoagulated latex, and then dip the latex coated form into a liquid coagulant such as formic or acetic acid diluted with alcohol or water as desired, or into a solution of a salt of a polyvalent metal in a suitable solvent, or I may spray such a fluid coagulant composition onto the fresh latex deposit, in which cases the latex will be coagulated quickly and an excess of coagulant will be deposited upon the surface of the coagulated rubber. Such use of chemical coagulants, however, is not essential to the invention hereof, and I may employ any of the other well known methods of forming rubber deposits from latex, including the use of suction applied to the interior of porous forms, the use of heated forms, electrophoretic means, or simply dipping a form into latex several times and drying the adhering coatings between dips.

Having formed the unvulcanized body of the glove in any of the manners described above, and preferably, although not necessarily before it has been washed and/or dried, I next deposit over all or a desired restricted portion of the unvulcanized glove surface a multitude of small discrete globules or droplets of liquid rubber latex in closely relationed but definitely spaced apart positions. If active coagulant is present upon the glove surface, as in my preferred procedure, the latex globules will be coagulated immediately upon striking the surface, or if no coagulant is present, the droplets may be dried rapidly to form a multitude of small irregularly shaped discrete particles or masses of rubber adhered to the surface. Finally, the glove is washed, dried and vulcanized in the usual manner.

It is important that the liquid latex from which the rubber masses are to be obtained be broken into fine droplets before it contacts with the glove surface and that the droplets not be applied in a quantity sufficient to cause them to coalesce and form a continuous smooth film upon the glove surface. This may be effected most advantageously, it has been found, by spraying the latex with a compressed air spray gun adjusted to deliver a spray much finer than normally is employed in spraying latex to form continuous coatings for example, and by using high air pressures in the region of 50 to 75 pounds per square inch, to project the fine latex droplets at a high velocity toward the portions of the glove surface at which non-slip properties are desired. In addition, it is essential that the spray stream be moved over the glove surface sufficiently fast that the number of droplets applied in a given area will always be insufficient to allow them to coalesce to form a continuous film. Generally, best results are obtained when the fine latex spray is passed over the same surface area once only at a moderate rate of speed to insure complete isolation of the rubber droplets, each from the others, although this is of course dependent upon the adjustment of the spray stream and the speed at which it is moved over the glove surface. Definite instructions concerning such details of procedure obviously cannot be given since they are to a great extent relative and must be determined by trial under each particular set of conditions.

Because of the characteristic low temperature coefficient of plasticity of latex rubber, the small rubber masses do not soften greatly or become plastic at elevated temperatures and consequently do not lose their shape or flow together in the course of the drying and vulcanizing operations, but maintain their separate relationship adhered to and projecting from the glove surface. These multitudinous small irregularly shaped projecting rubber masses provide in the finished glove a rough scabrous surface possessing excellent non-slip characteristics even when wet, and the glove surface in some cases presents a soft downy "feel" and appearance unique in an all rubber article containing no admixed or superficially applied fibers.

A preferred procedure will be described more in detail with reference to the accompanying drawing in which Fig. 1 is a diagrammatic view illustrating a preferred method of applying discrete rubber particles or masses to the surface of an unvulcanized rubber glove; and Fig. 2 is an enlarged vertical section through a portion of a glove embodying the present invention, illustrating crudely the rough scabrous surface of the glove.

In a preferred procedure for manufacturing gloves, an impervious glove form 10 which may be made of glazed porcelain, metal, glass, bakelite, ebonite, etc. is dipped into a solution of a polyvalent metal salt in a volatile organic solvent, for example a solution containing 300 grams of calcium chloride dissolved in one liter of denatured alcohol, the form is withdrawn together with an adhering film of the solution and at least a portion of the alcohol is allowed to evaporate to produce a substantially non-flowing coating of calcium chloride upon the form. The coated form then is immersed in an aqueous dispersion of rubber, preferably a compounded latex containing about sixty per cent. total solids, and the form is allowed to remain immersed in the latex until a layer of rubber 11 of a desired thickness, say about 0.010 inch, has been deposited upon the form by the coagulating action of calcium ions diffusing from the coated form. The form and associated deposited coating of rubber then are withdrawn from the latex and are allowed to stand for a short time until the rubber has become completely set or coagulated by the calcium ions which diffuse throughout the fresh rubber deposit and which after a few moments are present in appreciable quantities upon the outer surface thereof. Thereafter, and preferably before the rubber is washed or dried, a sprayed stream of latex 12 is directed toward the glove by means of a compressed air spray gun 14 and a multitude of discrete globules or droplets of liquid latex are deposited upon the glove surface, there to be instantly coagulated to produce discrete irregularly shaped rubber masses 15 adhering to the glove surface. Air pressures in the region of 50 to 75 pounds per square inch are employed and the spray gun is manipulated in the manner hereinabove described to insure the application of the latex droplets in isolated positions and to prevent the production of a smooth continuous latex film or coating which would not possess the desired scabrous surface. Thereafter, the glove is washed, dried, and vulcanized in the usual manner.

No definite or specific combination of operating conditions is required to produce the desired scabrous surface for all the many factors contributing to produce such surfaces are interdependent and may be varied within rather wide limits without changing the essential character of the surface produced. However, as an indication of a suitable combination of conditions adaptable to the foregoing example and designed to produce a scabrous surface satisfactory for surgeons' gloves, a specific set of operating conditions will be described. The spray gun of the foregoing example may be a gun of the type made and sold by the Paasche Air Brush Co. under the designation "UBRF-2" or any one of the other commercially available guns especially designed to spray liquid rubber latex. The gun is operated by compressed air at a pressure of approximately 50 pounds per square inch and is adjusted to deliver approximately 19 grams of latex per minute, the latex being the centrifugally concentrated latex of commerce which contains about 60% total solids and has a viscosity about twice that of water. The spray gun operated under these conditions is directed from a distance of about 18 inches toward the surface of the freshly deposited latex rubber glove prepared as hereinabove described, and the gun is caused to move with respect to the glove at a rate of approximately 40 feet per minute or two-thirds foot per second. This set of operating conditions will produce a satisfactory scabrous surface and will serve as a guide although it is to be understood that in practice it is not necessary actually to measure and determine these conditions as mere observation will indicate whether or not the latex is being applied in a quantity suitable to produce the desired result and the quantity applied may be varied as required by altering any one or more of several factors such as air pressure, adjustment of the spray gun, speed of travel past the glove, etc.

In an alternative method, the rubber masses are applied to the glove by spraying a fine stream of latex on to the glove body after it has been washed and immediately after it has been dried, while the rubber still is heated to a temperature considerably above ordinary room temperatures. In this method the heat of the rubber serves to coagulate the latex droplets to form discrete rubber masses. The glove may even be sprayed while in a heated atmosphere to aid this heat coagulation of the latex particles.

Syneresis of the latex droplets effected by the coagulant and/or heat causes them to shrink and assume peculiar irregular configurations which provide the scabrous surface responsible for the superior non-slip or gripping properties as well as the unusual appearance of a glove made according to the present invention. When the projecting rubber masses are extremely fine or small, the glove surface resembles both in appearance and "feel" certain types of suede leather and the cold harsh feel of ordinary rubber is completely absent. If the masses are larger, the appearance is somewhat different and the product more closely resembles a finely pebbled leather, although the non-slip properties apparently are in no wise impaired or lessened.

The invention is particularly useful in manufacturing thin all-rubber gloves for use by surgeons who require a reliable non-slip glove to protect their hands without unduly hampering their ability to manipulate surgical instruments while performing delicate operations where slippage of a moist or wet instrument held with an ordinary rubber glove might prove fatal to a patient. Gloves embodying the scabrous surface of the invention are equally useful, however, for use by housewives in handling wet dishes, etc., and in fact in any like operation where non-slip characteristics in a glove or other rubber article are essential or desirable. Beautiful decorative effects may be produced by employing colored latices for applying the rubber masses to the glove surface. Although in the preferred embodiment of my invention, the body of the glove is made directly from latex or an analogous aqueous dispersion of rubber, it is nevertheless true that gloves made from rubber cements can be given excellent non-slip surfaces and the utility of the invention is by no means confined to the manufacture of latex rubber gloves, nor in fact to gloves of any type since the invention obviously is useful in manufacturing other rubber articles in which a non-slip surface of the type described is desirable.

Numerous modifications and variations may be made in details of the invention as hereinabove described without departing from the spirit of the discovery as indicated in the appended claims.

I claim:

1. A glove comprising a rubber glove body having at least a portion of its surface provided with adherent projecting masses of rubber producing a non-slip surface, said adherent projecting masses of rubber being coagulated globular particles of latex rubber having irregular configurations but blending smoothly with the glove body in such manner as to provide a high degree of frictional resistance with minimum harshness in feel.

2. A glove comprising a rubber glove body and a multitude of small irregularly shaped discrete latex rubber masses adhered to and projecting from the body in tortured configurations characteristic of latex masses coagulated in situ, said masses providing an irregular rough surface having non-slip characteristics.

3. A vulcanized rubber glove suitable for use by a surgeon in performing surgical operations, said glove comprising a thin glove body and a multitude of small irregularly shaped discrete latex rubber masses having the configurations characteristic of latex droplets coagulated in situ and being uniformly distributed over and adhered to at least a portion of the outer surface of the glove body providing a scabrous non-slip surface particularly adapted for handling wet or moist objects without slippage.

4. The method of making a rubber glove having at least a portion of its surface roughened, which comprises producing an unfinished rubber glove, directing a stream of latex droplets toward the portion of the glove where roughening is desired for a brief time insufficient to form a continuous coating upon the glove, and subjecting the droplets to a solidifying treatment before any substantial flow of the droplets has occurred on the glove surface, whereby a multitude of projecting rubber masses of irregular configurations is provided upon the glove producing the desired rough surface.

5. The method of making a vulcanized rubber article comprising a rough surface having non-slip characteristics which comprises producing, by deposition from a liquid dispersion of rubber upon a shaped form, an unvulcanized rubber body constituting the article proper, treating the body to render its surface capable of coagulating liquid rubber latex droplets substantially immediately upon contact therewith, uniformly distributing over at least a portion of said surface a multitude of small droplets of liquid rubber latex in a quantity insufficient to produce a continuous coating, whereby the latex droplets are coagulated substantially without flow to produce a multitude of small irregularly shaped deposits of unmasticated latex rubber adhered to and uniformly distributed over the said surface, and vulcanizing the article.

6. The method of making a vulcanized rubber article comprising a rough surface having non-slip characteristics which comprises producing an unvulcanized rubber body constituting the article proper, heating the surface of the body to a temperature sufficiently high to coagulate liquid rubber latex droplets substantially without flow upon contact therewith, uniformly distributing over at least a portion of the surface so heated a multitude of small droplets of liquid rubber latex in a quantity insufficient to produce a continuous coating, whereby the latex droplets are coagulated substantially without flow to produce a multitude of small irregularly shaped deposits of unmasticated latex rubber adhered to and uniformly distributed over the said surface, and vulcanizing the article.

7. The method which comprises heating a surface to a temperature sufficiently high to coagulate liquid rubber latex droplets substantially without flow upon contact therewith, distributing over at least a portion of the surface so heated a multitude of small droplets of liquid rubber latex in a quantity insufficient to produce a continuous coating, whereby the latex droplets are coagulated substantially without flow to produce a multitude of irregularly shaped small deposits of unmasticated latex rubber distributed over the said surface.

8. The method of making a vulcanized rubber article comprising a rough surface having non-slip characteristics which comprises producing, by deposition from an aqueous dispersion of rubber upon a shaped form, an unmasticated latex rubber body constituting the article proper, uniformly distributing over at least a portion of the surface of said body in a limited quantity insufficient to produce a continuous coating a multitude of small isolated deposits of liquid rubber latex, coagulating said latex deposits in situ to produce a multitude of small irregularly shaped isolated deposits of unmasticated latex rubber adhered to and uniformly distributed over the said surface to provide the desired rough non-slip characteristics and vulcanizing the rubber.

9. The method which comprises chemically coagulating rubber from latex to form an unvulcanized rubber article having active coagulant associated with its surface, spraying latex upon said surface in a quantity insufficient to form a smooth continuous coating thereon, and drying and vulcanizing the rubber to provide an article having a rough rubber surface.

10. The method which comprises depositing upon a shaped form rubber from latex, coagulating the rubber upon the form with a chemical coagulent employed in a quantity sufficient to leave an excess of active coagulant at the surface of the deposited rubber, spraying latex onto said surface in a quantity insufficient to form a smooth continuous coating, and drying and vulcanizing the rubber to provide an article having a scabrous surface comprising adherent discrete rubber masses.

11. The method of making an article having a surface comprising rubber in which at least a portion of said rubber surface is roughened, which comprises applying a latex coagulant to a base member, applying liquid latex to the coagulant-treated base member to produce thereon a continuous deposit of latex rubber coagulum, permitting a substantial quantity of coagulant to diffuse to the outer surface of the coagulum deposit, directing a spray of liquid latex upon the coagulant-bearing outer surface of the coagulum for a brief time insufficient to form a continuous coating and sufficient only to apply a multitude of discrete rubber masses, and drying the rubber.

12. The method which comprises coating a form with a latex coagulant, immersing the coated form in a body of liquid latex, withdrawing the form with the resultant coagulated rubber deposit thereon, permitting a substantial quantity of coagulant to diffuse to the outer surface of the deposit, directing a spray of liquid latex upon the coagulant-bearing surface for a brief time to deposit upon said surface a multitude of isolated rubber masses, and drying and vulcanizing the rubber to provide a rubber article having a scabrous surface.

13. The method which comprises coating a form with a latex coagulant, immersing the coated form in a body of liquid latex, withdrawing the form with the resultant coagulated rubber deposit thereon, permitting a substantial quantity of coagulant to diffuse to the outer surface of the deposit, before washing the rubber deposit directing a spray of liquid latex upon the unwashed coagulant-bearing rubber surface for a brief time to deposit upon said surface a multitude of isolated rubber masses, then washing, drying and vulcanizing the rubber to provide a rubber article having a scabrous surface.

MERRILL E. HANSEN.